United States Patent [19]

Reedy et al.

[11] 4,426,055
[45] Jan. 17, 1984

[54] PRECISION TRANSLATOR

[75] Inventors: Robert P. Reedy; Daniel W. Crawford, both of Livermore, Calif.

[73] Assignee: The United States of America as represented by the United States Department of Energy, Washington, D.C.

[21] Appl. No.: 356,568

[22] Filed: Mar. 9, 1982

[51] Int. Cl.³ .............................................. F16M 11/12
[52] U.S. Cl. ..................................... 248/184; 33/286; 248/274; 248/286; 269/71
[58] Field of Search .............. 248/274, 276, 278, 900, 248/184, 286; 33/286; 308/2 A; 269/71, 73

[56] References Cited

U.S. PATENT DOCUMENTS

| | | | |
|---|---|---|---|
| 2,177,921 | 10/1939 | Zofrey | 248/276 X |
| 2,601,119 | 6/1952 | Johnson | 33/199 |
| 2,833,053 | 5/1958 | Gergen | 33/199 |
| 3,108,508 | 10/1963 | Warden | 83/13 |
| 3,436,050 | 4/1969 | Tibbals, Jr. | 248/278 X |
| 3,453,011 | 7/1969 | Meinunger | 248/413 X |
| 3,596,863 | 8/1971 | Kaspareck | 248/278 |
| 3,625,097 | 12/1971 | Harkness | 33/185 X |
| 3,814,365 | 6/1974 | Mackenzie | 248/278 |
| 3,918,167 | 11/1975 | Gerber | 33/185 R |
| 4,019,806 | 4/1977 | Fellows et al. | 350/96 C |
| 4,054,119 | 10/1977 | Hansen et al. | 248/274 X |
| 4,124,272 | 11/1978 | Henderson et al. | 350/96.21 |
| 4,130,344 | 12/1978 | Lemonde | 350/96.21 |
| 4,147,405 | 4/1979 | Spainhour | 350/96.21 |
| 4,181,401 | 1/1980 | Jensen | 350/96.21 |
| 4,186,994 | 2/1980 | Denkin et al. | 350/96.17 |

Primary Examiner—J. Franklin Foss
Assistant Examiner—David L. Talbott
Attorney, Agent, or Firm—L. E. Carnahan; Roger S. Gaither; Richard G. Besha

[57] ABSTRACT

A precision translator for focusing a beam of light on the end of a glass fiber which includes two turning fork-like members rigidly connected to each other. These members have two prongs each with its separation adjusted by a screw, thereby adjusting the orthogonal positioning of a glass fiber attached to one of the members. This translator is made of simple parts with capability to keep adjustment even in condition of rough handling.

4 Claims, 4 Drawing Figures

PRECISION TRANSLATOR

BACKGROUND OF THE INVENTION

The government has rights in the invention disclosed herein which arose under, or in the course of United State Department of Energy Contract No. W-7405-ENG-48 with the University of California.

The present invention relates to an apparatus for aligning articles; and, more particularly, it relates to a precision translator for focusing a beam of light on the end of a glass fiber.

It is a common practice in the present optical field to focus a beam of light on the end of a very small glass fiber. To attain this, a device having the capability of an extraordinary precise adjustment is needed. Furthermore, the alignment must be maintained even in conditions of rough handling in the most stringent environment. Also, prevailing conditions can make subsequent adjustment almost impossible in situations where a misalignment could result in loss of data during costly experiments.

The apparatus in the known prior art for alignment applications are large and bulky. Furthermore, once alignment has been achieved, the operation of locking this apparatus in place usually upsets the adjustment. Also, since the prior art apparatus consist of a number of separate movable parts the slight misfunctioning of any part may cause roughness and jerkiness in the motion of the fiber or other object to be aligned making very difficult the alignment process.

These and other unique problems associated with such aligning devices require a very strong, compact and economical construction. In addition the device must have the capability to adjust the position of an object retained therein with high accuracy while locking that position in place in order to resist rough handling in very stringent environments.

It is accordingly, a general object of the invention to provide a device for accurate aligning of a glass fiber with a beam of light.

Another object of the invention is to provide an aligning device capable of keeping its adjustment even with subsequent rough handling in a stringent environment.

Other objects, advantages and novel features of the invention will be apparent to those of ordinary skill in the art upon examination of the following detailed description and the accompanying drawings of a preferred embodiment of the invention.

SUMMARY OF THE INVENTION

An apparatus is provided to precisely position and keep alignment of an object. The apparatus utilizes two orthogonal rigidly connected tuning fork-like members, one of which is to attach an object to be aligned such as a glass fiber. The tuning fork-like members are movably mounted on a base. The separation of the prongs of each member is adjusted by a screw, thereby adjusting the orthogonal positioning of the glass fiber.

A difference between the invention and prior art apparatus is that the invention consists of few and very simple parts while the apparatus in the known prior art are complex and bulky in nature with many movable parts. An advantage of the invention is that the alignment can be maintained even in conditions of rough handling. Another advantage of the invention is that the simplicity of its parts will lower the construction costs providing a very competitive product in the market.

DESCRIPTION OF PREFERRED EMBODIMENT

Reference will now be made in detail to the preferred embodiment of the invention, which is illustrated in the accompanying drawings.

While the invention will be described in connection with a preferred embodiment of aligning glass fibers, it will be understood that it is not the intention to limit the invention to that embodiment or to the specific described use. On the contrary, it is intended to cover all alternatives, modifications, and equivalents, as may be included within the scope of the invention defined in the appended claims.

Figure 1:
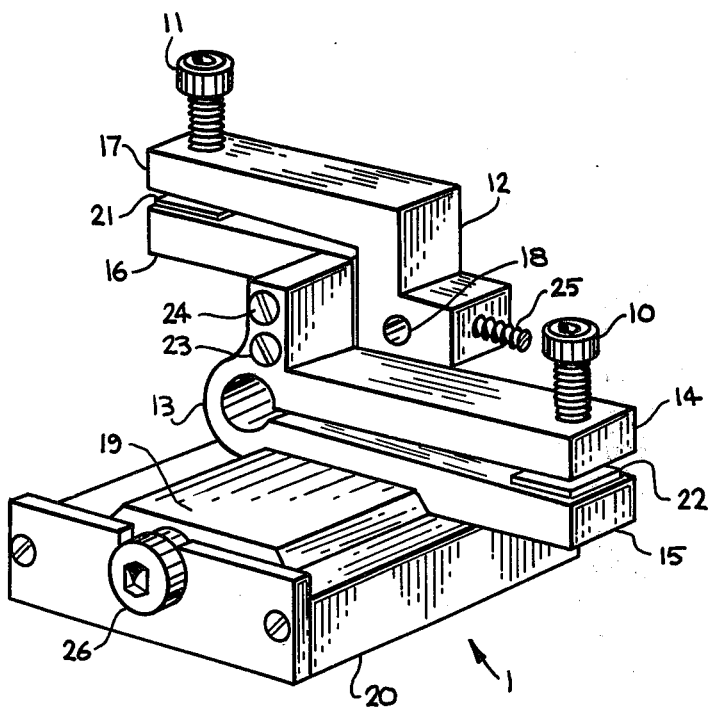
FIG. 1 is an isometric view of an embodiment of the invention from its left and front side.

Referring to FIG. 1, the precision translator generally indicated at 1 is shown. The two main parts of this device are tuning-fork like members 12 and 13. Member 12 includes a pair of prongs 16 and 17, while member 13 includes a pair of prongs 14 and 15. Prong 14 of member 13 is provided with an adjustment screw 10 while prong 17 of member 12 is provided with an adjustment screw 11. The adjustment motion of the translator 1 is caused by screw 10 in prong 14 which thrusts against a plate 22 carried by prong 15. Similarly screw 11 in prong 17 thrusts against a plate 21 carried by prong 16. Members 12 and 13 are rigidly attached to one another by means of screws 23 and 24 passing through both members, as shown in FIG. 1. The prongs 16 and 17 of member 12 each include a right angle bend for compactness (see FIG. 2). An optical fiber or other object to be positioned is held within a ferrule and inserted in a hole 18 in prong 17 of member 12 and retained in the hole by screw 25. Each of screws 10 and 11 may have a steel ball (not shown) inserted on its end. In order to reduce friction, plates 21 and 22, made of polished steel, for example, are positioned so that the screws 10 and 11 or the steel ball may be pressed upon. Each screw 10 and 11 controls an essentially orthogonal and independent motion of the optical fiber by transferring motion from one member to the other. The prongs of each member 12 and 13 act as lever arms so that for any advance or retraction of screws 10 and 11, the corresponding motion of the optical fiber is proportionally less. In general, the closer the hole 18 is to the axis of member 12 the less directional effect the motion of member 13 has on it.

Figure 2:
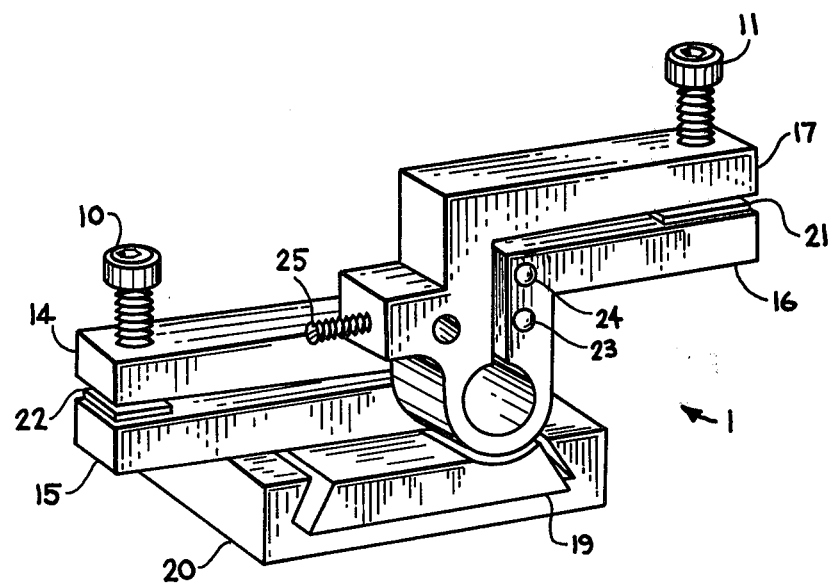
FIG. 2 is an isometric view of the FIG. 1 embodiment from its left and rear side.
Figure 3:
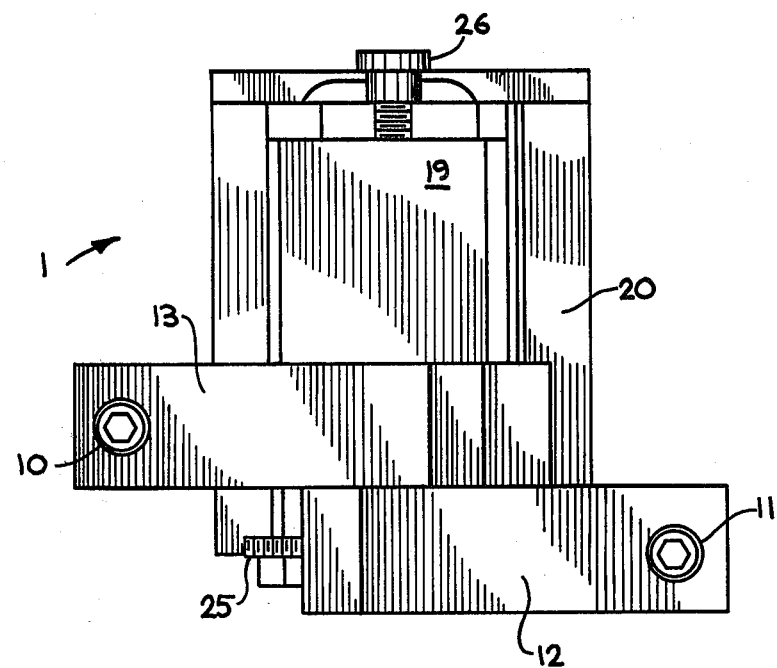
FIG. 3 is a plan view of the FIG. 1 embodiment.
Figure 4:
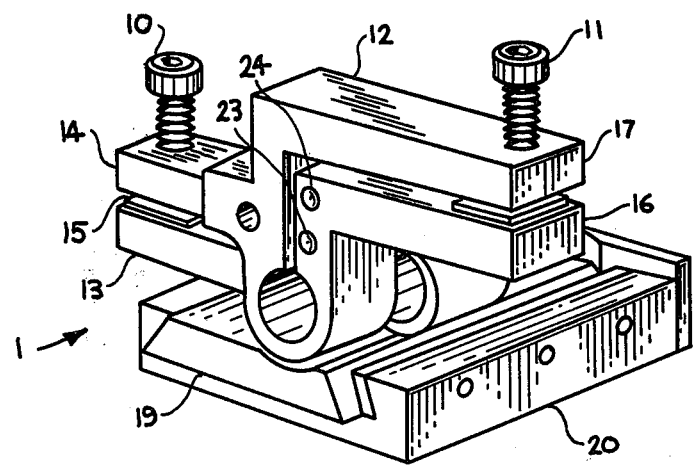
FIG. 4 is an isometric view of the FIG. 1 embodiment from its right and rear side.

The translator 1 is first put into a position of preliminary adjustment by means of the sliding base 19 of the mounting fixture 20, as shown in FIG. 2. The sliding base 19 is slidably moved by means of the turn knob or screw 26 (See FIG. 1). Next, final adjustment is accomplished by means of screws 10 and 11 as translator 1 is sequentially slid into proper position with respect to the focal point of the beam of light.

The various components of translator 1 may be made of the following materials: members 12 and 13 of 4140 tool steel; plates 21 and 22 and sliding base 19 of 01 tool steel; and mounting fixture 20 of brass.

The foregoing description of a preferred embodiment of the invention has been presented for the purpose of illustration and description. It was chosen to best explain the principles of the invention and their practical application to thereby enable others skilled in the art to best utilize the invention in various embodiments and with various modifications as are suited to the particular use contemplated.

What is claimed is:

1. An apparatus for precisely positioning and maintaining alignment of an object, which comprises:
    a pair of rigidly connected tuning fork-like members;
    a first of said pair of members having first and second prongs;
    a second of said pair of members having a third prong rigidly attached to said second prong of said first member and a fourth prong provided with means including a hole for inserting and retaining an associated object to be positioned and aligned;
    the prongs of said first member having an outer end extending in a direction substantially opposite to a direction of an outer end of said prongs of said second member;
    a mounting fixture having a movable base to which said first of said pair of members is rigidly attached for preliminary positioning an associated object;
    first adjusting means on said first of said pair of members for adjusting the spacing between said first and second prongs so that said hole is moved in a first direction; and
    second adjusting means on said second of said pair of members for adjusting the spacing between said third and fourth prongs so that said hole is moved in a second direction substantially perpendicular to said first direction.

2. An apparatus as recited in claim 1, wherein said first and second adjusting means comprises:
    first and second screws means respectively for adjusting an associated object position by controlling orthogonally the object motion reducing said motion with any advance or retraction of said screws; and
    a plate positioned at said first and third prongs opposite said screw means to be contacted by thrust against said plate.

3. An apparatus as recited in claim 2, wherein said first screw extends through said second prong and thrusts against said first prong and said second screw extends through said fourth prong and thrusts against said third prong.

4. An apparatus as recited in claim 1, wherein said third and fourth prongs of said second of said pair of members each include a right angle bend therein.

* * * * *